UNITED STATES PATENT OFFICE.

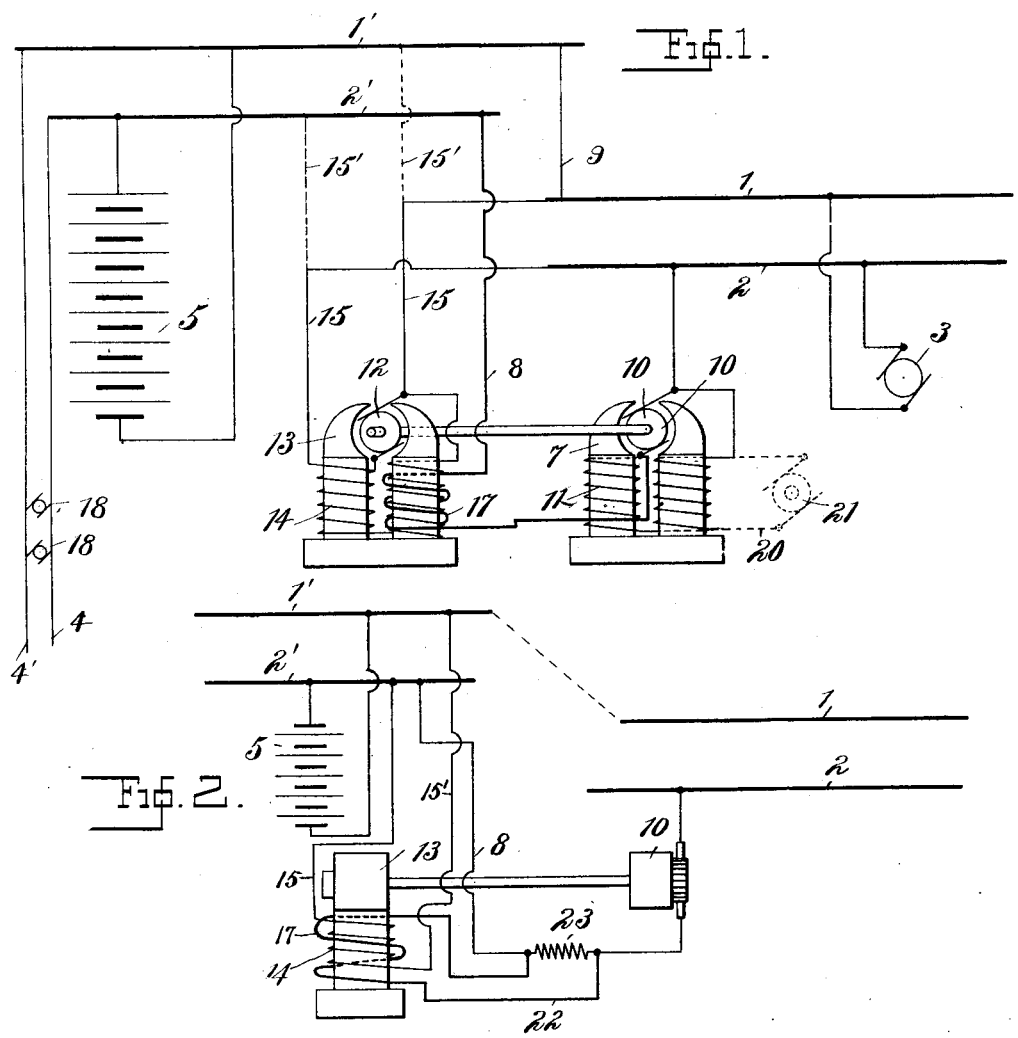

LAMAR LYNDON, OF NEW YORK, N. Y.

BOOSTER APPARATUS FOR SYSTEMS OF ELECTRICAL DISTRIBUTION.

SPECIFICATION forming part of Letters Patent No. 648,874, dated May 1, 1900.

Application filed November 22, 1899. Serial No. 737,843. (No model.)

*To all whom it may concern:*

Be it known that I, LAMAR LYNDON, a citizen of the United States, residing in the city of New York, borough of Manhattan, in the State of New York, have invented certain new and useful Improvements in Booster Apparatus for Systems of Electrical Distribution, of which the following is a specification.

This invention relates to booster apparatus for systems of electrical distribution; and its object is to effect the regulation of the booster in a simple and effective manner.

In systems of distribution utilizing storage batteries as reserve sources of power and potential equalizers and in certain other applications of electrical energy it is necessary to provide boosting means for enabling charging of the battery to compensate for the variations in voltage and for the difference between charging voltage and discharging voltage of the battery or to "boost" the voltage of a system for other reasons, and in order that such boosting means shall respond to the varying conditions of electromotive force on the line it is necessary to provide regulating means therefor, whereby the extra voltage supplied by the booster is graduated at each instant to the requirements of the system. To this end I provide means responsive to current conditions in one of the circuits, preferably the booster-circuit, to regulate the speed of the booster, and thus the electromotive force thereby supplied to the circuit.

In the accompanying drawings, Figure 1 is a diagrammatic view of the system of distribution embodying my invention. Fig. 2 shows a modification.

Referring to Fig. 1, the dynamo bus-bars are indicated at 1 2 and are connected as usual to the dynamos, one of which is indicated at 3. Power bus-bars or conductors 1' 2' are connected to the consumption-circuit 4 4' and are connected at one side to a dynamo bus-bar either directly or through storage batteries, resistance, or other connection, (indicated by line 9.) The storage battery 5 is connected across the auxiliary or power bus-bars or conductors. The booster is included in circuit 8, leading from generator-bus to auxiliary or power bus. It will be understood that the usual switches and connections are provided for establishing or changing the connections of the battery and booster, a switch, for example, being provided to connect the battery directly with the consumption-circuit; but as my invention relates to the booster-regulating means such connecting means are not shown in detail.

The booster 7 is preferably shunt-wound, having armature 10 and shunt-wound field-coil 11. Mechanically connected by shaft, belting, or gearing with the booster-armature 10 is the armature 12 of a motor 13, this motor being also shunt-wound, its armature 12 and shunt-field winding 14 being energized by connections or wires 15 15, leading to bus-bar 1 2, as shown in full lines, or, if desired, the motor may be connected to the auxiliary bus-bar, as indicated at 15' in dotted lines. In either case the result would be to drive the motor at approximately-constant speed, except under conditions as hereinafter mentioned. The shunt-field winding 14 of the motor is so proportioned that under normal conditions the field excitation of the motor is considerably below the point of saturation.

Included in the booster circuit or connection 8 is a winding 17, which is placed on the motor 13, preferably around one, all, or any convenient number of its field-magnets, so to reinforce or aid the shunt-coil in the excitation of the field thereof. This auxiliary coil is in series with the consumption-circuit and receives the current passing to the consumption devices, such as motors or lamps, (indicated at 18,) in such circuit, and the effect of this auxiliary series coil is to regulate the action of the booster as follows: On increase of current in the consumption-circuit the auxiliary winding 17 increases the field magnetization of motor 13, thus causing the armature thereof to run slower, with the result that the auxiliary or booster electromotive force developed by the booster connection 10 is correspondingly decreased, thus producing directly the desired regulating effect. In case a shunt-wound booster is used, as shown, the decrease of electromotive force developed by the armature also results in a corresponding decrease of current in the field-coils, so that the electromotive force is further decreased. The arrangement shown gives, therefore, a double regulating effect, due in part directly to the slowing down of the booster and in part to the resulting decrease of field strength thereof. It is, however, clear that the regulation could still be accomplished, although not so effectively, if the field-winding of the booster were separately excited, as by circuit 20, including an exciter 21, as indicated in dotted lines, which exciter may be connected by a separate winding on the booster-armature. In either case the speed of the motor, and therefore of the booster, is regulated inversely to the strength of current in the booster and in the consumption-circuit, the field strength of the motor being regulated responsively to the current in said circuit.

Instead of exciting the auxiliary coil 17 in the motor-field by direct connection thereof in the booster-circuit it may be connected in any manner, so as to be directly responsive to the current in said circuit. Thus in Fig. 2 the connection 22, leading to said auxiliary coil 17, is shown as leading from opposite ends of a resistance 23, included in the booster-circuit, thereby putting the auxiliary motor field-coil in shunt with said resistance, so as to receive from the booster-circuit a current which is proportional to but may be less than the main booster-current by any desired amount.

Having thus described my invention, what I claim as new therein, and desire to secure by Letters Patent, is—

1. In a system of electrical distribution, the combination with supply and consumption circuits of a storage battery and a booster connected therewith, a motor for operating the booster and regulating means responsive to the current in the booster, and adapted to control the speed of such motor inversely to the strength of current in the booster.

2. In a system of electrical distribution the combination with supply and consumption circuits of a storage battery and a booster connected therewith, a motor for operating the booster and a winding connection with one of the aforesaid circuits and adapted to regulate the speed of the motor inversely to the strength of current in the booster.

3. In a system of electrical distribution the combination with supply and consumption circuits of a storage battery and a booster connected therewith, an electric motor for operating the booster and an auxiliary field-coil on the motor in series relation with the consumption-circuit and adapted to regulate the speed of the motor inversely to the strength of current in the consumption-circuit.

4. In a system of electrical distribution the combination with supply and consumption circuits of a storage battery and a booster connected therewith, a shunt-wound electric motor for operating the booster, having energizing connection with the supply-circuit, an auxiliary winding on said motor in series relation with the consumption-circuit and adapted to regulate the speed of the motor inversely to the strength of current in the consumption-circuit.

5. In a system of electrical distribution the combination with supply and consumption circuits of a storage battery and a booster connected therewith, said booster being shunt-wound, a shunt-wound motor also connected with one of such circuits and an auxiliary coil on said motor connected with the booster and adapted to increase the energization of the motor-field responsively to the strength of current in the booster.

6. In a system of electrical distribution, the combination with supply and consumption circuits, of a booster connected thereto, an electric motor adapted to operate said booster and an auxiliary coil connected with said booster and adapted to increase the strength of field of the motor responsively to the current in the booster.

LAMAR LYNDON.

Witnesses:
J. GREEN,
A. P. KNIGHT.